United States Patent [19]

Cristante

[11] Patent Number: 4,551,026
[45] Date of Patent: Nov. 5, 1985

[54] HOUSEHOLD APPLIANCE FOR MAKING ICE CREAM

[75] Inventor: Guido Cristante, Omegna, Italy

[73] Assignee: I.P.E. Nuova Bialetti S.p.A., Crusinallo di Omegna, Italy

[21] Appl. No.: 577,152

[22] Filed: Feb. 6, 1984

[30] Foreign Application Priority Data

Feb. 4, 1983 [IT] Italy .............................. 20690/83[U]

[51] Int. Cl.⁴ .............................................. A23G 9/00
[52] U.S. Cl. ................................... 366/149; 366/205; 366/295; 366/312; 62/343
[58] Field of Search ............... 366/144, 145, 147, 149, 366/293, 295, 309, 312, 197, 205; 62/342, 343; 99/452, 453, 455

[56] References Cited

U.S. PATENT DOCUMENTS

| | | | |
|---|---|---|---|
| 3,465,540 | 9/1969 | Carpigiani | 62/343 |
| 3,952,538 | 4/1976 | Warlick | 366/144 X |
| 4,392,361 | 7/1983 | Cavalli | 366/309 |
| 4,450,692 | 5/1984 | Sharpe et al. | 62/342 |

Primary Examiner—Timothy F. Simone
Attorney, Agent, or Firm—Karl F. Ross; Herbert Dubno

[57] ABSTRACT

A device for making ice cream, particularly designed for household use, comprises a motor inside a housing driving two vertical shafts projecting from the bottom of two recesses within the housing. One recess, shallower and smaller than the other, forms a seat for a blender whose agitator is driven by the corresponding shaft. The other, deeper and wider recess has a mount adapted to support a freezing vessel having a hub which fits around a tubular boss surrounding the second shaft. The latter shaft carries a stirrer with one or more paddles. In one embodiment, in which the freezing vessel resting on the mount is an outer cup supporting a smaller inner cup to facilitate the simultaneous preparation of two loads of ice cream of different flavors, at least one paddle of the stirrer reaches around the rim of the inner cup to enter the outer cup. The peripheral wall of this second recess, maintained at low temperature by a surrounding cooling coil, is separated from the freezing vessel by an annular clearance filled with brine to prevent the formation of an ice layer therein.

4 Claims, 3 Drawing Figures

HOUSEHOLD APPLIANCE FOR MAKING ICE CREAM

FIELD OF THE INVENTION

My present invention relates to a device, especially a household appliance, for the making of ice cream.

BACKGROUND OF THE INVENTION

Typical ice-cream makers of the type here considered include a blender, in which the ingredients used to make ice cream of desired flavor are homogenized, and a freezing compartment in which the resulting mixture is cooled while being continually stirred. The cooling may be carried out with the aid of a surrounding mass of ice cubes or by mechanical refrigeration. In either case, the freezing compartment is generally designed as a depressed portion of a sheet-metal plate (usually of stainless steel) forming the top of the housing which encloses the cooling unit and which may also form a seat for the associated blender; the bottom of the depression forms a boss that is traversed by a drive shaft designed to support a stirrer serving to agitate the freezing mixture.

Since the recessed freezing compartment is integral with the housing, the resulting product must be scooped out somewhat laboriously and the cleaning of the wall and bottom surfaces is not very convenient. Thus, especially with mechanical refrigeration, a water jet must not be used for this purpose since the water could pass through the boss of the compartment bottom and damage the mechanism of the cooling unit, as by entering the venting apertures of its condenser. The normal expedient of wiping the compartment with a wet rag is unsatisfactory from a hygienic point of view.

The use of a removable vessel as a container for the mixture to be frozen has been heretofore considered impractical since an ice layer tends to form at the interface between such a vessel and the surrounding compartment wall, that layer not only impeding the removal of the vessel but also inhibiting the heat exchange between the contents of the vessel and the surrounding cooling unit.

OBJECTS OF THE INVENTION

The general object of my present invention, therefore, is to provide an improved ice-cream maker of the general type referred to in which the described drawbacks are avoided.

A more particular object of my invention is to provide a device of this character usable for simultaneously making ice cream of two or more flavors.

SUMMARY OF THE INVENTION

I realize this object, in accordance with my present invention, by providing a housing with a recessed compartment open at the top and bounded by a peripheral wall in contact with adjoining cooling means, the bottom of the compartment having a mount forming a tubular boss which surrounds part of a drive shaft rising through that mount; a freezing vessel is removably seated on that mount and has a central hub removably fitting onto the aforementioned boss while leaving a tip of the drive shaft projecting therefrom, this vessel adjoining the peripheral wall of the compartment with an intervening annular clearance which is to be filled with an aqueous salt solution or brine in order to prevent the formation of an ice layer as discussed above. The brine also acts as a heat-exchanging medium between the contents of the freezing vessel and the surrounding cooling means; the drive shaft, rotated by a source of motive power which preferably is an electric motor within the housing, carries on its projecting tip a stirrer with one or more paddles extending into the interior of the vessel for agitating its contents. The stirrer and the vessel can be overlain by a removable lid closing the compartment.

The motor driving the stirrer can also be coupled with another shaft projecting from the bottom of a recess for engagement with an agitator of a blender seated in that recess.

According to a more particular feature of my invention, the removable freezing vessel comprises two or more nested cups in which ice cream of different flavors can be made from mixtures that are being agitated by paddles of the same stirrer. At least in the case of the outer cup or cups, these paddles form one or more arms reaching around the rim of each inner cup.

BRIEF DESCRIPTION OF THE DRAWING

The above and other features of my invention will now be described in detail with reference to the accompanying drawing in which.

SPECIFIC DESCRIPTION

Figure 1:
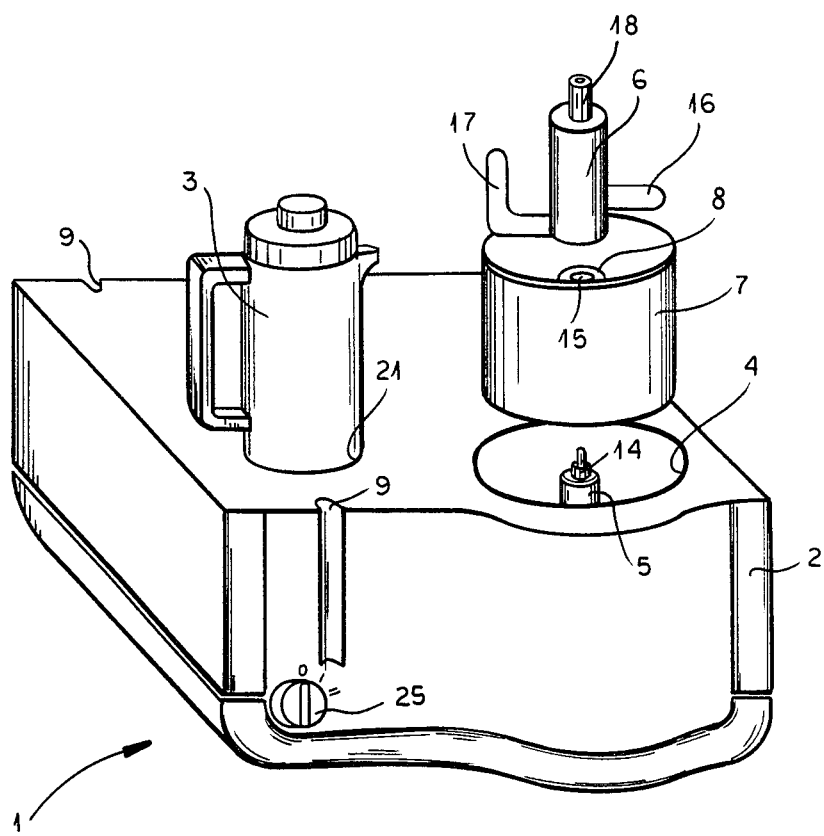
FIG. 1 is a perspective view of a partly disassembled ice-cream maker embodying my invention.

As shown in FIG. 1, a device for making ice cream in accordance with my present invention comprises a sheet-metal housing 2 whose top plate is formed with two cylindrical recesses 4 and 21, the first recess 4 forming a depression or compartment deep enough to accommodate a cup-shaped freezing vessel 7 also made of sheet metal such as stainless steel. The second recess 21, shallower than the first and of smaller diameter, serves as a seat for a removable blender 3. A tubular boss 5, rising from the bottom of compartment 4, surrounds a drive shaft 14 and fits into a central hub 8 of vessel 7, this hub having an upper end with an aperture 15 through which the tip of shaft 14 projects when the vessel 7 is lowered into the compartment 4. A stirrer 6 with two paddles 16, 17 forms a sleeve with a reduced upward extension 18 designed to receive the projecting tip of drive shaft 14 while coming to rest on an annular shoulder 19 of that shaft as seen in FIG. 2; the stirrer is held in position by a cap 22 integral with a screw 23 which engages in a threaded bore of the tip of the shaft as likewise seen in FIG. 2.

FIG. 1 also shows the housing 2 provided on opposite sides with a pair of finger grooves 9 facilitating its handling by a user. A knob 25 is manually settable for the control of a potentiometer in the engerizing circuit of a drive motor 35 inside the housing, illustrated schematically in FIG. 2, in order to vary its operating speed. The motor may be connected to a wall socket through a cable which during periods of nonuse may be coiled up on a reel in a lateral compartment of the housing, as described and shown in my copending application Ser. No. 577,151 filed on even date herewith.

Figure 2:
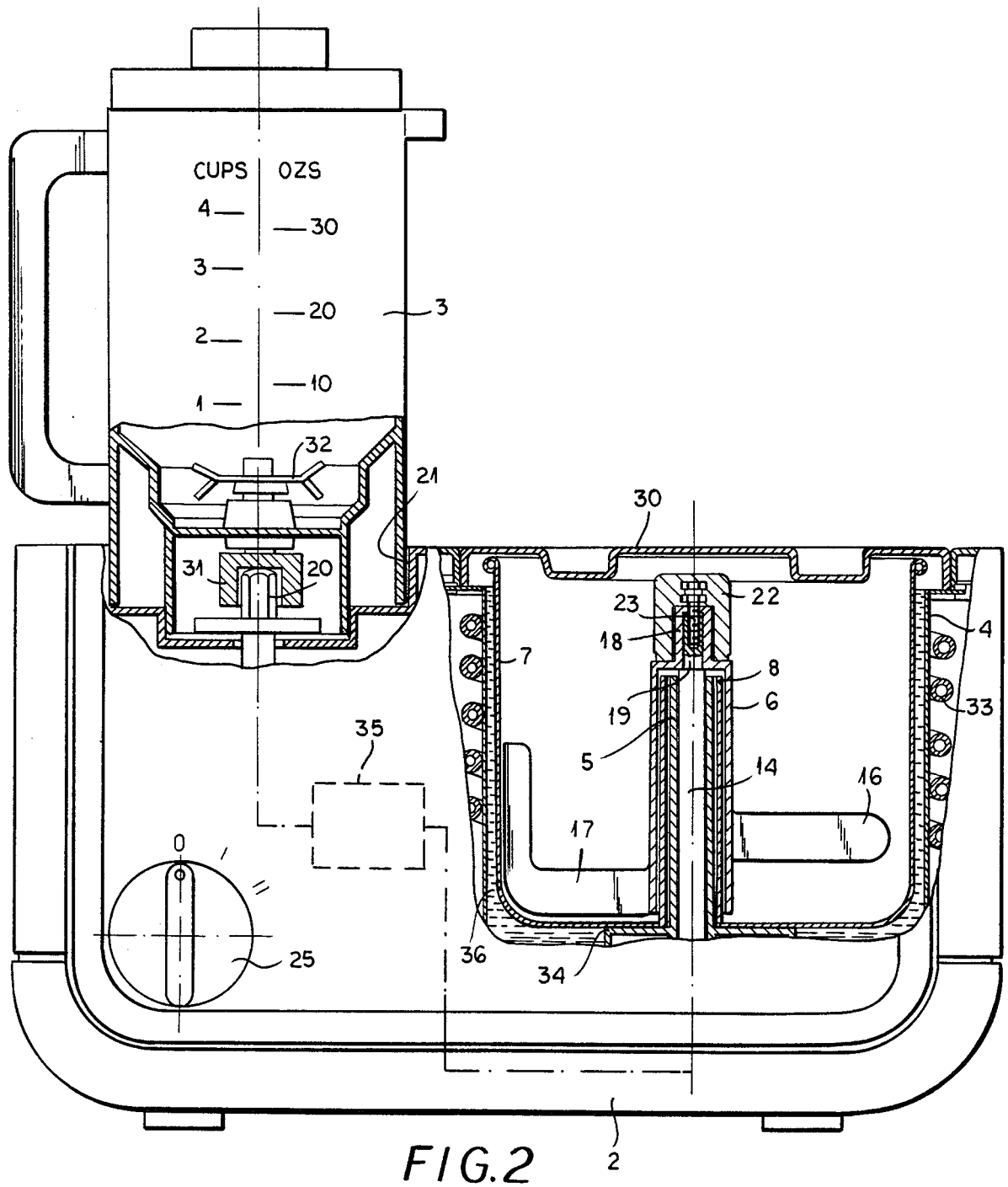
FIG. 2 is an elevational view, with parts broken away, of the embodiment illustrated in FIG. 1.

As seen in FIG. 2, recess 21 has a bottom penetrated by another shaft 20 which is also powered by drive motor 35 and engages a hub 31 of an agitator 32 within blender 3 when that blender is seated in this recess.

The peripheral wall of compartment 4 is cooled to the requisite low temperature by a refrigerating unit represented in FIG. 2 by a coil 33 surrounding that wall; a nonillustrated compressor of this unit is likewise driven by motor 35. In the assembled position illustrated in that Figure, in which the vessel 7 rests on a mount 34 integral with boss 5, the vessel is separated from the wall of recess 4 by an all-around annular clearance filled with brine 36. Compartment 4 is closed by a removable lid 30 overlying the vessel 7 and the stirrer 6 in the assembled position. It will be noted that the sleeve of the stirrer 6 spacedly surrounds the hub 8 of vessel 7 so as to contact neither that hub nor the boss 5 onto which hub 8 is nonrotatably fitted.

Lid 30 may be secured to the rim of compartment 4 by a bayonet coupling arresting it in a predetermined rotary position in which that lid may close a microswitch in series with another microswitch, closed upon proper insertion of blender 3, in the energizing circuit of motor 35 in order to prevent the operation of that motor in any position in which the shafts 14 and 20 are exposed. Such a safety arrangement has been disclosed in my concurrently filed application identified above.

Figure 3:
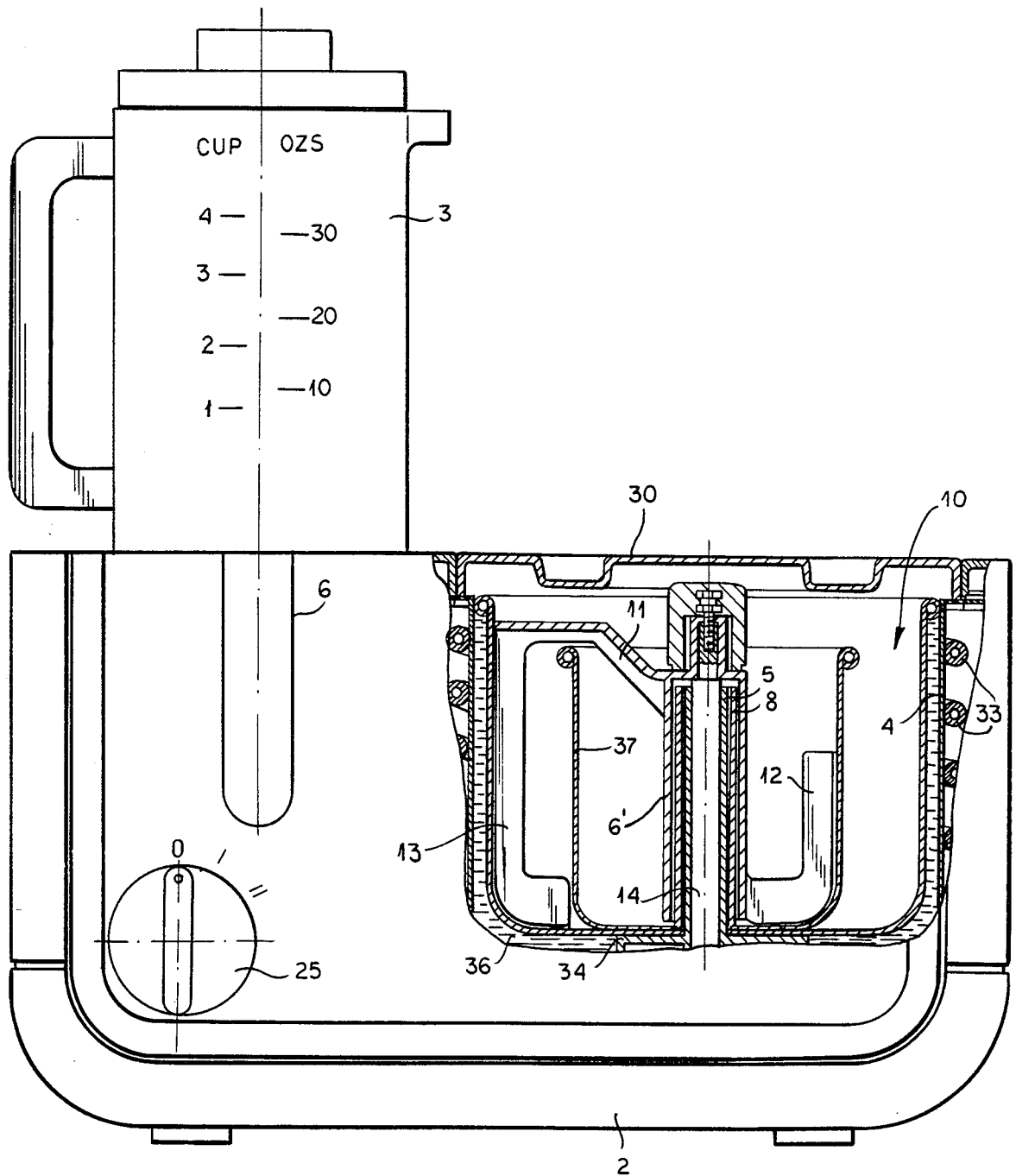
FIG. 3 is a view similar to FIG. 2, showing a modification.

In FIG. 3 I have illustrated a device according to my invention differing from that of FIGS. 1 and 2 only by the replacement of the single vessel 7 with two nested stainless-steel cups, namely an outer cup 10 and an inner cup 37. Cup 10, just like cup 7 in FIG. 2, is separated from the wall of compartment 4 by a clearance filled with brine 36 while resting on the mount 34 at the bottom of this compartment. Cup 37, whose diameter is somewhat more than half that of cup 10, sits on the bottom of the latter and fits closely around the hub 8 thereof. A modified stirrer 6', secured to shaft 14 in the manner described for the stirrer 6 of FIGS. 1 and 2, has a lower paddle 12 sweeping the interior of cup 37 and an upper paddle 13 with a cantilevered arm 11 reaching around the rim of cup 37 to sweep the interior of cup 10. The inner cup 37 may contain a mixture of one flavor while the outer cup 10 contains, within the space not occupied by cup 37, a mixture of another flavor which are simultaneously frozen into ice cream. The two mixtures, of course, can be separately prepared in the blender 3 whose structure and mode of operation is entirely conventional.

All three cups 7, 10, 37 are shown provided with rolled rims facilitating their manual extraction upon removal of the lid 30 and stirrer 6 or 6'; such removal, of course, requires the prior stopping of motor 25, preferably ensured by a microswitch under the control of lid 30 as discussed above and more fully disclosed in my concurrently filed application Ser. No. 577,151, pending.

I claim:
1. A device for making ice cream, comprising:
   a housing provided with internal cooling means, said housing forming a recessed compartment open at the top and bounded by a peripheral wall in contact with said cooling means;
   a drive shaft rising through a mount at the bottom of said compartment, said mount forming a tubular boss surrounding part of said drive shaft;
   a freezing vessel provided with a central hub removably fitting onto said boss while leaving a tip of said drive shaft projecting therefrom, said freezing vessel adjoining said peripheral wall with an intervening annular clearance to be filled with brine;
   a stirrer removably carried on said tip and provided with paddle means extending into the interior of said freezing vessel for agitating the contents thereof; and
   a source of motive power coupled to said drive shaft for rotating same together with said stirrer, said freezing vessel comprising an outer cup and a smaller inner cup separably nested in said outer cup, said paddle means including a lower paddle sweeping the interior of said inner cup and an upper paddle reaching around a rim of said inner cup for sweeping the interior of said outer cup whereby two different types of ice cream can be prepared within said inner cup and between said inner and outer cups respectively.

2. A device as defined in claim 1 wherein said compartment is provided with a removable lid overlying said stirrer and said vessel.

3. A device as defined in claim 1 wherein said stirrer is provided with a sleeve spacedly surrounding said boss and carrying said paddle means.

4. A device as defined in claim 1 wherein said source of motive power is an electric motor in said housing, further comprising a second shaft driven by said motor and projecting from the bottom of a recess forming a seat for a blender having an agitator rotatably engageable by said second shaft.

* * * * *

UNITED STATES PATENT AND TRADEMARK OFFICE
CERTIFICATE OF CORRECTION

PATENT NO.   :   4,551,026
DATED        :   5 November 1985
INVENTOR(S)  :   Guido CRISTANTE ET AL.

It is certified that error appears in the above-identified patent and that said Letters Patent is hereby corrected as shown below:

In the heading, left column, item [73], please correct assignee's name to read as follows:

-- I.P.E. NUOVA BIALETTI S.P.A. Industria Prodotti Elettrodocmestici --.

Signed and Sealed this

Sixth Day of May 1986

[SEAL]

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,551,026
DATED      : 5 November 1985
INVENTOR(S): Guido CRISTANTE It is certified that error appears in the above-identified patent and that said Letters Patent is hereby corrected as shown below:

On the title page, left column, Item [73],
please correct assignee's name to read as follows:

-- I.P.E. NUOVA BIALETTI S.P.A.
Industria Prodotti Elettrodomestici -- .

This certificate supersedes Certificate of Correction issued May 06, 1986.

Signed and Sealed this

Eighth Day of September, 1992

Attest:

DOUGLAS B. COMER

*Attesting Officer*    Acting Commissioner of Patents and Trademarks